(12) United States Patent
Ghoshal

(10) Patent No.: US 6,907,322 B2
(45) Date of Patent: Jun. 14, 2005

(54) METHOD AND APPARATUS FOR CHARACTERIZATION OF THERMAL RESPONSE OF GMR SENSORS IN MAGNETIC HEADS FOR DISK DRIVES

(75) Inventor: Uttam Shyamalindu Ghoshal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/726,281

(22) Filed: Nov. 30, 2000

(65) Prior Publication Data

US 2002/0095243 A1 Jul. 18, 2002

(51) Int. Cl.$^7$ .......................... G11B 5/127; G05D 23/00
(52) U.S. Cl. ...................... 700/299; 360/55; 360/97.02; 360/322; 360/324
(58) Field of Search ...................... 700/299; 360/322, 360/97.02, 55, 122, 126, 313, 314, 315, 316, 324, 319, 113

(56) References Cited

U.S. PATENT DOCUMENTS

| | | | | |
|---|---|---|---|---|
| 4,405,961 A | * | 9/1983 | Chow et al. | ................ 360/129 |
| 4,478,076 A | * | 10/1984 | Bohrer | .................... 73/204.16 |
| 5,409,547 A | * | 4/1995 | Watanabe et al. | ........... 136/204 |
| 5,477,701 A | * | 12/1995 | Kenyon et al. | ................ 62/225 |
| 5,850,324 A | * | 12/1998 | Wu et al. | .................... 360/322 |
| 5,889,641 A | * | 3/1999 | Belser et al. | ................ 360/313 |
| 5,966,275 A | * | 10/1999 | Iijima | ...................... 360/324.2 |
| 6,128,160 A | * | 10/2000 | Yamamoto | ............. 360/324.11 |
| 6,167,095 A | * | 12/2000 | Furukawa et al. | .......... 375/285 |
| 6,226,233 B1 | * | 5/2001 | McDaniel et al. | ........ 369/13.32 |
| 6,396,670 B1 | * | 5/2002 | Murdock | ..................... 360/319 |

* cited by examiner

*Primary Examiner*—Leo Picard
*Assistant Examiner*—Charles Kasenge
(74) *Attorney, Agent, or Firm*—Duke W. Yee; Casimer K. Salys; Theodore D. Fay, III

(57) ABSTRACT

A method and apparatus for characterization of a thermal response of giant magnetoresistive (GMR) sensors in magnetic read/write heads is provided. The method and apparatus make use of a probe to measure temperatures at a base and a tip of the probe. With the method and apparatus, a temperature of magnetic shields of the read/write head are cooled to a temperature lower than an ambient temperature. A current is then applied to the GMR sensor to increase a temperature of an air bearing surface such that the heat flow through the probe is zero. The amount of current applied, the resistance of the GMR sensor, the magnetic shield temperature, and the ambient temperature are used to calculate a thermal conductance of dielectric material in the read/write head. The thermal conductance is then utilized to estimate the signal to noise ratio of the GMR sensor and determine a maximum bandwidth of the read/write head.

44 Claims, 6 Drawing Sheets

METHOD AND APPARATUS FOR CHARACTERIZATION OF THERMAL RESPONSE OF GMR SENSORS IN MAGNETIC HEADS FOR DISK DRIVES

RELATED APPLICATIONS

The present application is related to commonly assigned U.S. Pat. No. 6,487,515, entitled "Method and Apparatus for Measuring Thermal and Electrical Properties of Thermoelectric Materials," issued on Nov. 26, 2002 and U.S. Pat. No. 6,467,951, entitled "Probe Apparatus and Method for Measuring Thermoelectric Properties of Materials," issued Oct. 22, 2002, both hereby incorporated by reference.

BACKGROUND OF THE INVENTION

1. Technical Field

The present invention is directed to a method and apparatus for characterization of a thermal response of giant magnetoresistive (GMR) sensors in magnetic heads for disk drives.

2. Description of Related Art

The requirement of high density magnetic storage of data on hard disk drives has been increasing steadily for the past several years. Hard disk drives include magnetic heads for reading and writing data to the hard disk. The magnetic heads include write coils and sensors for reading data from the disks.

Development of magnetoresistive (MR) sensors (also referred to as heads) for disk drives in the early 1990's allowed disk drive products to maximize storage capacity with a minimum number of components (heads and disks). Fewer components result in lower storage costs, higher reliability, and lower power requirements for the hard disk drives.

MR sensors are used for the read element of a read/write head on a high-density magnetic disk. MR sensors read magnetically encoded information from the magnetic medium of the disk by detecting magnetic flux stored in the magnetic medium of the disk. As storage capacity of disk drives has increased, the storage bit has gotten smaller and its magnetic field has correspondingly become weaker. MR heads are more sensitive to weaker magnetic fields than are the inductive read coils used in earlier disk drives. Thus, there has been a move away from inductive read coils to MR sensors for use in disk drives.

During operation of the hard disk drive, sense current is passed through the MR element of the sensor causing a voltage drop. The magnitude of the voltage drop is a function of the resistance of the MR element. Resistance of the MR element varies in the presence of a magnetic field. Therefore, as the magnitude of the magnetic field flux passing through the MR element varies, the voltage across the MR element also varies. Differences in the magnitude of the magnetic flux entering the MR sensor can be detected by monitoring the voltage across the MR element.

As discussed above, MR sensors are known to be useful in reading data with a sensitivity exceeding that of inductive or other thin film sensors. However, the development of Giant Magnetoresistive (GMR) sensors (also referred to as GMR head chips) has greatly increased the sensitivity and the ability to read densely packed data. Thus, although the storage density for MR disks is expected to eventually reach 5 gigabits per square inch of surface disk drive (Gbits/sq.in.), the storage density of GMR disks is expected to exceed 100 Gbits/sq.in.

The GMR effect utilizes a spacer layer of a non-magnetic metal between two magnetic metals. The non-magnetic metal is chosen to ensure that coupling between magnetic layers is weak. GMR disk drive sensors (or head chips) operate at low magnetic layers. When the magnetic alignment of the magnetic layers is parallel, the overall resistance is relatively low. When the magnetic alignment of the layers is anti-parallel, the overall resistance is relatively high. When the sensor is biased with a constant current source, the change in resistance results in a change of voltage ("signal voltage") across the GMR sensor. For a given GMR technology, the signal voltage is proportional to the amount of current passed through the GMR sensor. The current passing through the GMR sensor affects the temperature of the GMR sensor and thus, the thermal noise voltages. Large currents result in significant temperature change, and a large increase in the noise voltages. As the temperature increases, the ratio of signal voltage to noise voltage is reduced. This signal to noise ratio determines the bandwidth achievable by the GMR sensor.

Because GMR sensors allow extremely high data densities on disk drives, a stable sensor is essential to accurate read and write operations in high track density hard disk drives. It is known that temperature increases may cause the GMR sensor within the GMR element to exhibit unstable magnetic properties and efforts to reduce the temperature within the disk drive are ongoing.

As the requirements for the GMR sensors have been increasing over the years, the requirements for the write coils within the disk drives have also been increasing. New disk drives require fast field reversal during the write operation. This requirement for fast field reversal during the write operation implies larger write currents for gigahertz operation. Also, as the storage densities increase, the media coercivity has to increase to avoid thermal instability and the superparamagnetic limit. This also implies that larger write currents are necessary. However, large write currents increase the Joule heating in the coil such that the coil temperatures are commonly 40 to 80 degrees Celsius above ambient temperatures. However, for optimal operation, the write coils need to be kept near ambient temperatures.

Several passive and active cooling methods have been proposed to reduce the temperatures in the magnetic heads. These methods and designs require accurate determination of the thermal conductivity and/or microscale temperature characterization. The traditional thermal characterization methods cannot be easily extended to microscopic characterization because of increased parasitic losses associated with the magnetic head probes.

Scanning thermal microscopy (SThM) is a promising technique for microscale thermal characterization and has been recently used for this application. Unfortunately, the SThM methods proposed do not yield accurate temperature profiles. There is a substantial drop in temperature between the probe tip and the GMR/dielectric surface due to interface impedance. Hence it is difficult to calculate the thermal conductivities of these low thermal conductivity thin film materials.

Thus, there is a need for a mechanism by which thermal conductivities of low thermal conductivity thin film materials can be accurately calculated for use in thermal management of magnetic read/write heads.

SUMMARY OF THE INVENTION

A method and apparatus for characterization of a thermal response of giant magnetoresistive (GMR) sensors in magnetic read/write heads is provided. The method and apparatus make use of a probe to measure temperatures at a base and a tip of the probe. With the method and apparatus, the temperature of the magnetic shields of the read/write head is reduced to a temperature lower than the probe temperature. A current is then applied to the GMR sensor to increase the temperature at an air bearing surface until the heat flow through the probe is zero, or substantially zero. The amount of current applied, the resistance of the GMR sensor, the magnetic shield temperature, and the ambient temperature are used to calculate the thermal conductance of the dielectric material in the read/write head. The thermal conductance is then utilized to estimate the signal to noise ratio of the GMR sensor and thereby determine a maximum bandwidth of the read/write head.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
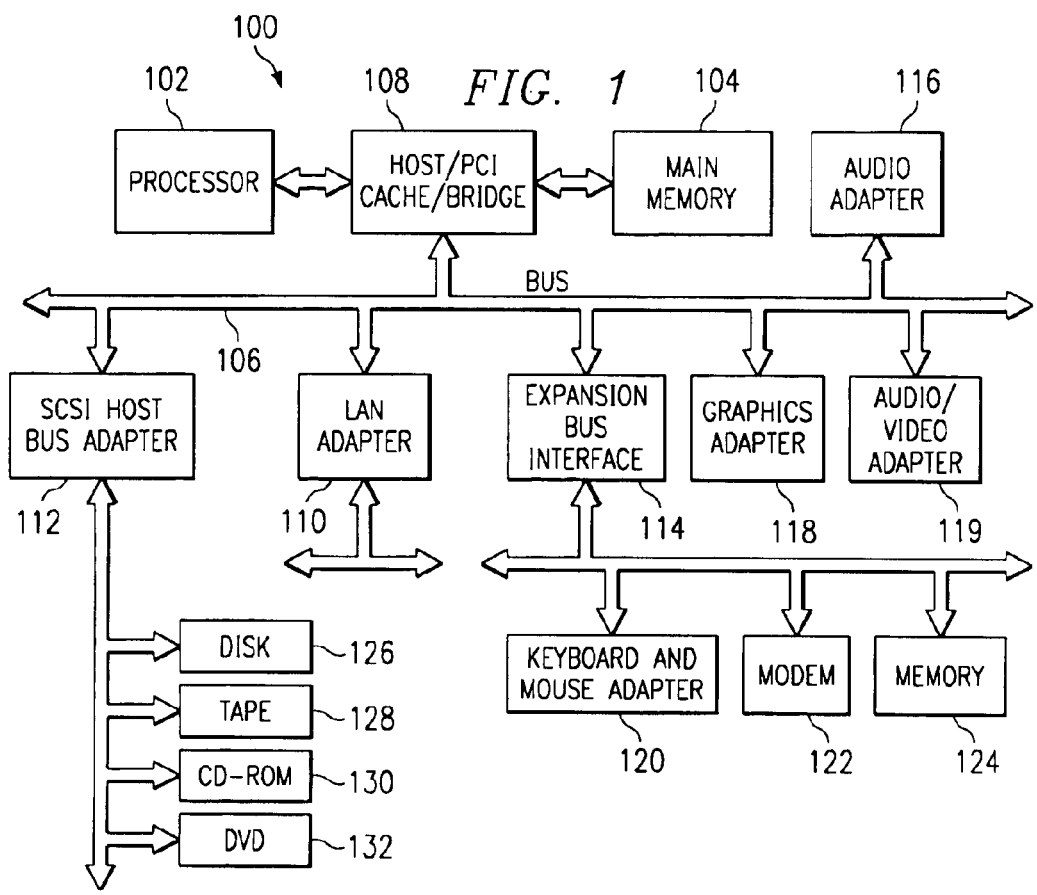
FIG. 1 depicts a block diagram of a data processing system in which the present invention may be implemented.

With reference now to the figures, and in particular with reference to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures, such as Micro Channel and ISA, may be used. Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. In the depicted example, SCSI host bus adapter 112 provides a connection for hard disk drive 126, tape drive 128, CD-ROM drive 130, and digital video disc read only memory drive (DVD-ROM) 132. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 100. Instructions for the operating system, the object-oriented operating system, and applications or programs are located on a storage device, such as hard disk drive 126, and may be loaded into main memory 104 for execution by processor 102.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

Figure 2:
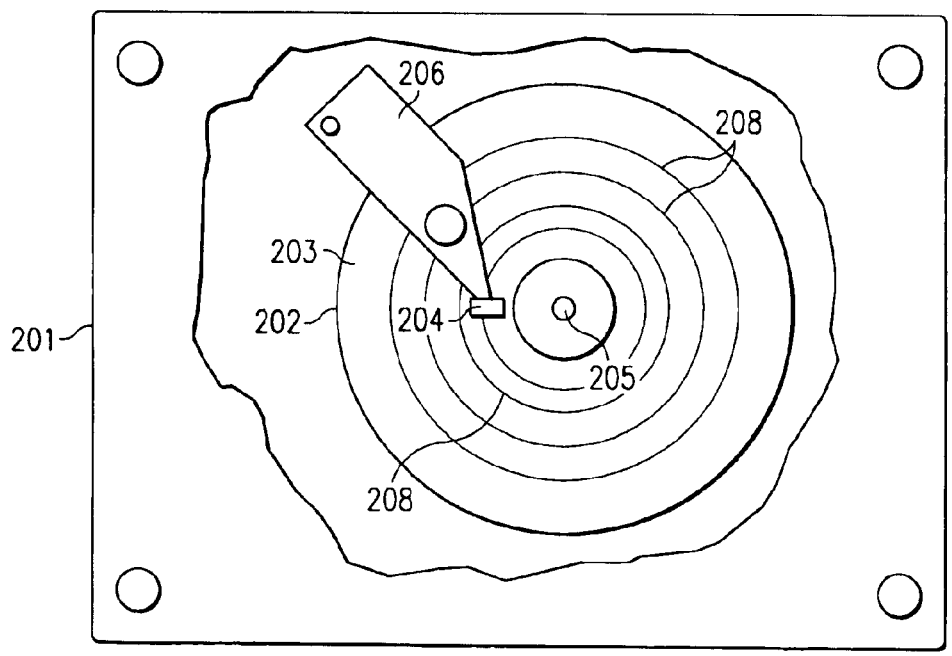
FIG. 2 depicts a cut-away, top plan view of a data storage system in accordance with the present invention.

With reference now to FIG. 2, a cut-away, top plan view of a data storage system is depicted in accordance with the present invention. Data storage system 200 is an example of a data storage system which may be implemented as a disk drive such as, for example, disk drive 126 in FIG. 1. Data storage system 200 includes a housing 201 containing at least one rotatable data storage disk 202 supported on a spindle 205 and rotated by a drive motor (not shown). Typically, a data storage system will comprise a plurality of disks and a slider 206 with a read/write head 204 for each disk. As an example, in a magnetic disk storage device, each data storage disk 202 has the capability of receiving and retaining data, through the use of a magnetic recording medium formed on at least one disk surface 203, where the magnetic recording medium is arranged in an annular pattern of multiple concentric data tracks 208. Though only a few data tracks 208 are shown, it is known that the number of tracks varies according to at least the recording medium and the read/write head 204. At least one slider 206, including one or more read/write heads 204 is positioned over data storage disk 202. Slider 206 is suspended from an actuator arm (not shown) by a suspension (also not shown) and the radial position of slider 206 with respect to data tracks 208 of data storage disk 202, is controlled by a voice coil motor (not shown).

During operation of data storage system 200, the rotation of data storage disk 202 generates an air bearing between slider 206 and disk surface 203. The air bearing counterbalances a slight downward-biased spring force of the suspension and supports slider 206 above disk surface 203 by a small, substantially constant spacing. As disk 202 is rotated by the drive motor, slider 206 is moved radially in and out in response to the movement of the actuator arm by the voice coil motor, permitting read/write head 204 to read and write data from and to the concentric tracks 208. Though only one read/write head 204 and slider 206 assembly is shown, it is well known that a plurality of sliders 206 may be employed to access a plurality of disks 202, stacked one atop the other on spindle 205.

The temperature of read/write head 204 may rise during operation of data storage drive 200 due to previously discussed magnetic field changes and ambient conditions in data storage system 200. During operation, read/write head 204, passes through magnetic field changes induced by stored data in the magnetic medium of disk 202. Temperature increases in read/write head 204 may be the result of many different causes including Joule heating of the sensing current, frictional asperities, the magnetic field changes encountered while passing over the surface of disk 202, and the like. As read/write head 204 passes over magnetically encoded data in the form of bits, the changing magnetic fields encountered by read/write head 204 causes head resistance to change, which generates heat within read/write head 204. Magnetic instability may arise in read/write head 204 due to increasing read/write head 204 temperatures. Magnetic instability causes noise and, concurrently, distortions in a current flow pattern in an active region (area (not shown) between bias field conductors of read/write head 204). A thermoelectric cooling (TEC) device, may be mounted in close proximity to read/write head 204 to provide an active heat transfer device. Also, the TEC device may utilize a separate power source or in very low temperature conditions, the same power source as the read/write head 204.

Figure 3A:
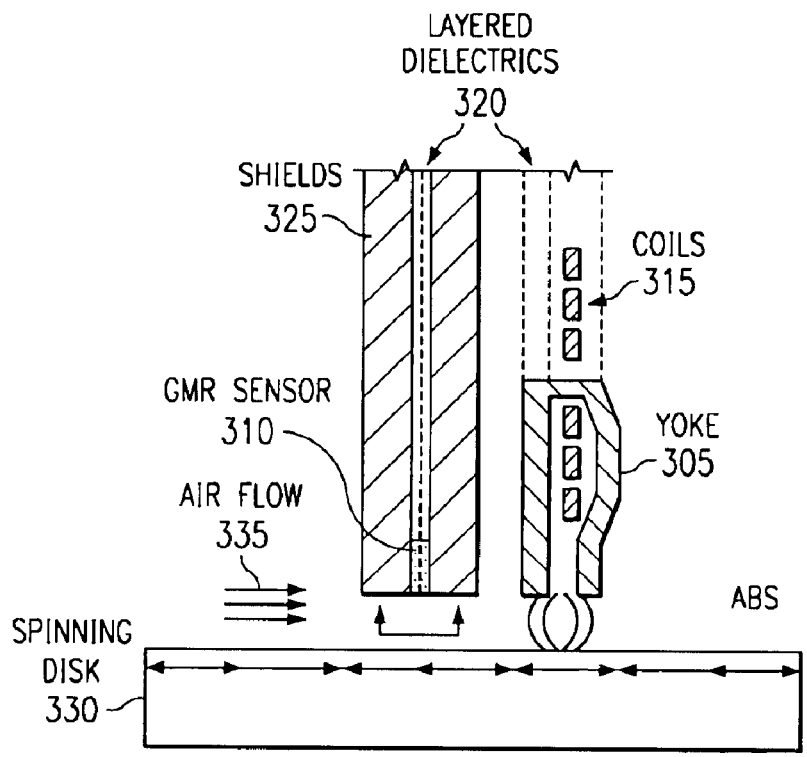
FIGS. 3A and 3B are exemplary block diagrams illustrating a GMR sensor in a magnetic read/write head.
Figure 3B:
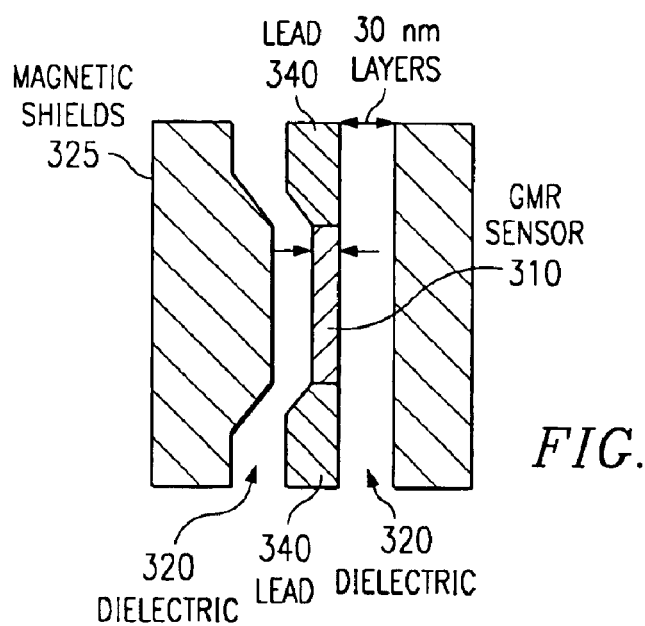

FIGS. 3A and 3B show cross sections of a magnetic head 300 having a giant magnetoresistive (GMR) sensor 310. As shown in FIG. 3A, the magnetic head 300 includes a yoke 305, a GMR sensor 310, coils 315, layered dielectrics 320, and magnetic shields 325. The magnetic head 300 is positioned above a spinning magnetic disk 330 with a gap 335 allowing for air flow between the magnetic head 300 and the spinning disk 330. The coils 315 generate a magnetic field for writing data to the spinning disk 330. The coils 315 are wrapped around yoke 305 which focuses the magnetic field created by the coils 315. The GMR sensor 310 is used for reading data from the spinning disk 330. The layered dielectrics 320 are used as an insulator for insulating the GMR sensor 310 from the magnetic shields 325. The magnetic shields 325 shield the write operations of the coils 315 from the read operations of the GMR sensor 310.

FIG. 3B shows a magnified view of the GMR sensor 310 from the air bearing surface (ABS), such as represented by arrows 338. The GMR sensor 310 is positioned between two electrical leads 340. The GMR sensor 310 is also sandwiched between dielectrics 320 and magnetic shields 325.

The GMR sensor 310 typically operates at approximately 50 degrees Celsius above the spinning disk ambient temperature. Most temperature drops occur within the GMR sensor 310 layers and the ultra-thin alumina dielectrics 320 between the GMR sensor 310 and the magnetic shields 325. The present invention provides a method and apparatus for accurately characterizing the thermal conditions of the GMR sensor 310 at the tip of the magnetic head 300.

The present invention provides a method and apparatus for measuring and characterizing the thermal and electrical properties of GMR sensors in magnetic read/write heads. The invention makes use of temperature sensors, such as thermocouples and thermistors, for thermal probes and uses a surface electrode at the thermal probe tip for making electrical measurements on a sample of the thermoelectric material.

The preferred embodiment of the present invention makes use of two thermocouples as the temperature sensors of the present invention. However, it should be appreciated that the present invention may use other types of temperatures sensors to measure the temperature values at various points on the probe without departing from the spirit and scope of the present invention. For example, rather than two thermocouples, the present invention may use one or more thermistors in place of or in addition to one or more of the thermocouples of the preferred embodiment. For purposes of illustration, however, the present invention will be described in terms of a probe having two thermocouples which are used to measure temperature.

While the present invention will be described in terms of using a particular type of probe to measure heat flow through the surface of a read/write magnetic head, the invention is not limited to this particular probe design. Rather, any probe that is capable of measuring heat flow may be used without departing from the spirit and scope of the present invention. The preferred embodiments, however, make use of a probe having the configuration and operational abilities herein described.

Figure 4:
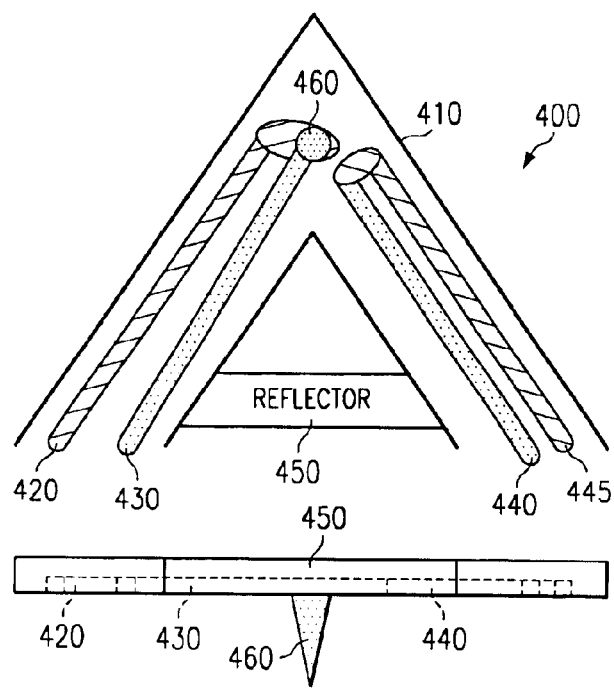
FIG. 4 is an exemplary diagram illustrating a probe in accordance with the present invention.

FIG. 4 is an exemplary diagram illustrating two views of a probe 400 in accordance with the present invention. The probe shown in FIG. 4 is used to measure the thermoelectric properties of thermoelectric materials in a manner described in detail hereafter. The probe in FIG. 4 makes use of two thermocouples to provide measurements of temperature that are then used to calculate thermoelectric properties of the thermoelectric material sample under test.

As shown in FIG. 4, the probe 400 includes a cantilever substrate structure 410, a first lead 420, a second lead 430, a third lead 440, a fourth lead 445, a reflector 450, and a cone 460. The leads 420–445 create two thermocouples which are used, in a manner to be described hereafter, to measure the temperature of the probe tip (cone 460 tip) and the temperature of a sample material. From these measurements, the thermoelectrical properties of the sample material may be determined.

The reflector 450 is used to reflect a laser beam toward a detector (not shown). The laser beam, reflector 450 and detector are used to measure the deflection of the cantilever structure 410 in order to maintain the distance between the probe tip 460 and the sample material at a constant value.

Figure 5:
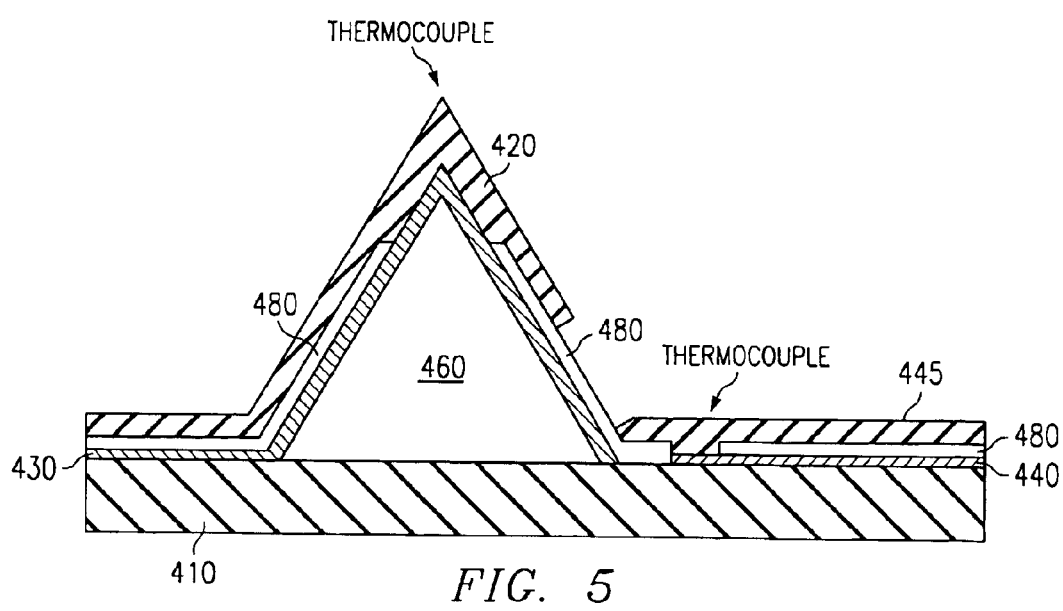
FIG. 5 is an exemplary cross-sectional view of the probe in accordance with the present invention.

FIG. 5 is an exemplary cross section of the probe tip 460. As shown in FIG. 5, the probe tip 460 is comprised of a number of different layers of material. The particular materials described hereafter with reference to the exemplary embodiment are meant to be for illustrative purposes and other materials having similar properties may be used in replacement or in addition to the materials described herein without departing from the spirit and scope of the present invention.

The formation of the probe tip 460 will now be described with reference to FIG. 5. The formation of the probe tip 460 is generally described in the incorporated co-pending U.S. Pat. Nos. 6,487,515 and 6,467,951. The mechanisms used to create the various layers of the probe, such as deposition and etching, arc generally known in the art of semiconductor chip manufacture. However, these mechanisms have not previously been used to create the structure herein described.

The cantilever substrate 410 is created first and is comprised of a silicon or silicon nitride material. A silicon oxide cone 460 is formed on the cantilever substrate 410. A secondary metal layer is then created over the substrate 410 and the cone 460. The secondary metal layer may be, for example, chromium, and is used to create the second lead 430 and third lead 440.

It should be noted that the chromium layer does not cover all of the surface of the substrate 410 and cone 460. Rather, as shown in FIG. 5, a portion of the chromium layer at the base of the cone is etched away so that the two leads 430 and 440 are formed without touching one another.

Once the two leads 430 and 440 are created, a silicon oxide layer 480 is created on top of the chromium layer. The silicon oxide layer 480 is etched at the apex of the cone and at a point at the base of the cone to create two thermocouples which will be used in the present invention to perform thermoelectric property measurements of sample materials.

After the silicon oxide layer 480 is created, the primary metal layer 420 is created. The primary metal layer 420 is comprised of platinum/iridium in an exemplary embodiment, but may be any other type of metal which may be determined to have properties especially well suited for a particular application. As shown in FIG. 5, the primary metal layer 420 is etched away at position near the base of the cone to thereby create the first and fourth leads 420 and 445.

The interaction of the primary and secondary metal layers at the points where the silicon oxide layer 480 was etched away, creates the thermocouples which are used for measurements of nanoscopic material properties. Additional layers of material may be added to the structure shown in FIG. 5 so long as these additional layers do not interfere with the operation of the dual thermocouples. For example, fine wires may be added to the cantilever structure 410 for heating the cantilever structure to thereby create a temperature differential, as will be described hereafter.

While the probe structure shown in FIGS. 4 and 5 show a cone-shaped probe tip, the probe tip may be of any shape desirable. For example, the cone-shaped probe tip may be very narrow or very wide in diameter, may have any value interior angle at the tip, and the like. However, a narrower tip is preferable since the tip localizes measured temperature fields to a smaller area and thus, makes the probe capable of measuring thermal properties of smaller scale materials.

The probe created using the process described above can be used for making measurements in many different applications. For example, the probe may be used to determined the thermoelectrical characteristics of a GMR sensor read/write head in a disk drive.

Those of ordinary skill in the art will appreciate that the probe of the present invention is utilized along with a computing system, such as, for example, the computing system shown in FIG. 1, in which the calibration and computations described hereafter are performed. The probe is used to provide measured quantities which are then processed by the computing system to calibrate the probe and generate values for the thermoelectric properties of the materials under test.

Before the probe can be used to measure the thermoelectric properties of sample materials, the probe must be calibrated. The calibration is performed using a sample whose thermoelectric properties are generally known in order to obtain a relationship of thermoelectric properties. The calibration method generally includes the steps of:
1) measuring the voltages across each of the thermocouples;
2) measuring the temperature from a bottom lead to the back side of the sample;
3) calibrating temperature according to NIST standards based on the above measurements; and
4) calibrating heat flow using the known thermoelectrical properties of the sample.

Figure 6:
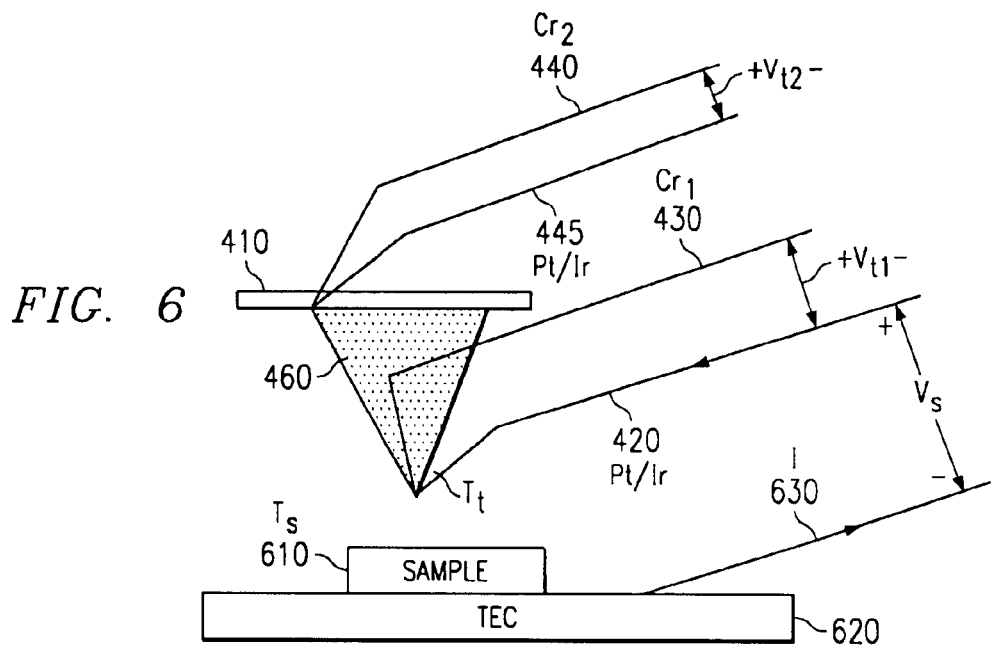
FIG. 6 is an exemplary circuit diagram illustrating the thermocouples of the probe.

FIG. 6 shows a circuit schematic for a mixed mode operation probe in accordance with the present invention. As shown in FIG. 6, the probe 400 consists of a first lead 420, a second lead 430, a third lead 440 and a fourth lead 445. The voltage $V_{t1}$ across the first and second leads 420 and 430, connected to the thermocouple at the tip 460, are used to monitor the temperature and the heat flow out of the tip of the cone of the probe. The voltage $V_{t2}$ across the third and fourth leads 440 and 445, connected to the thermocouple at the base, are used to monitor the temperature and the heat flow at the base of the cone of the probe. Based on these voltages, the difference in temperature $\Delta T_t$ between the tip and base of the cone can be calculated. Current-voltage (I-Vs) measurements at the first and fifth leads 420 and 630 characterize the electrical properties of the sample 610.

Figure 7:
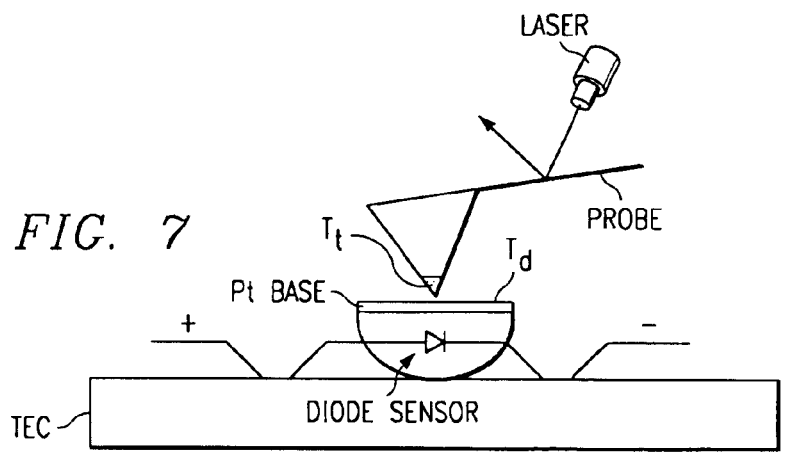
FIGS. 7 and 8 are diagrams illustrating two methods of performing the calibration in accordance with the present invention.
Figure 8:
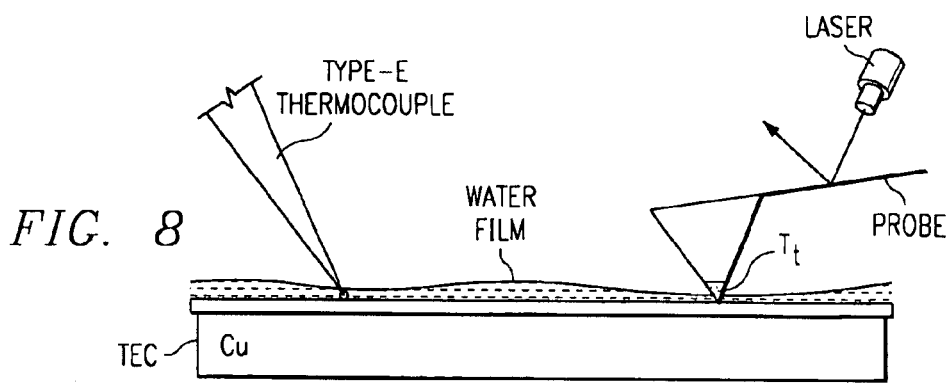

The temperature sensors, i.e. thermocouples, at the tip may be calibrated in a number of different ways. In particular, the preferred embodiment of the present invention calibrates the temperature sensors at the tip by scanning the probe tip over a base of a pre-calibrated surface and over a metal surface of a thermoelectric cooler 620 concurrently. For example, the pre-calibrated material may be a platinum base of a pre-calibrated silicon diode mounted on the thermoelectric cooler and the metal surface may be a copper metal surface of the thermoelectric cooler 620, as shown in FIG. 7. In separate calibration, scanning a metal surface of a thermoelectric cooler may be concurrently monitored by a pre-calibrated E-type thermocouple, for example, as shown in FIG. 8. Regardless of the particular manner by which calibration is performed, the method of temperature calibration is essentially the same.

The temperature sensors, i.e. thermocouples, at the tip and base of the cone 460 are used to measure voltage values for various tip and sample temperatures. With the present invention, a laser, which may be used may be used to detect cantilever deflection of the probe 400, is switched OFF and the thermoelectric cooler 620 is activated to increase and decrease the temperature of the sample near the ambient.

Figure 9:
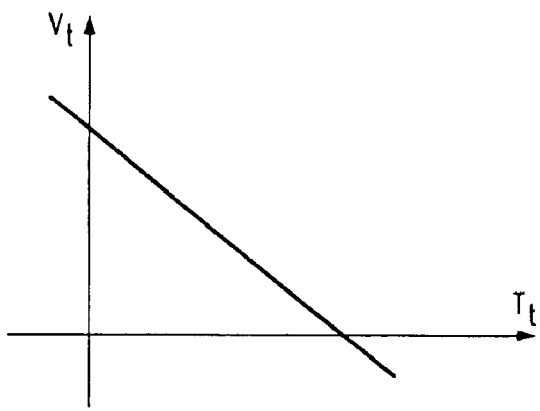
FIG. 9 is an exemplary graph of voltage versus temperature at the tip of the probe, the relationship having been obtained from temperature calibration of the probe.

Measurements of the voltages $V_{t1}$ and $V_{t2}$ are made using the thermocouples and are used to plot a relationship between the voltages and the temperature of the precalibrated surface. Using National Institute of Standards and Technology (NIST) temperature standards, a relationship of voltage to temperature is identified using known points. FIG. 9 shows an exemplary relationship between the tip voltage and the tip temperature. In this way, a one-to-one relation table between the thermocouple sensor voltage V and the temperature T may be obtained.

Although the above method is used in the preferred embodiment of the present invention, other methods of performing temperature calibration may be used with the present invention without departing from the spirit and scope of the present invention.

Once temperature calibration is performed, the thermocouple sensors must be calibrated for measurement of heat flow. The heat flow calibration makes use of a material having known thermoelectric properties. In particular, materials having known Seebeck coefficient α and thermal conductivity $\lambda_k$, are utilized.

Figure 10:
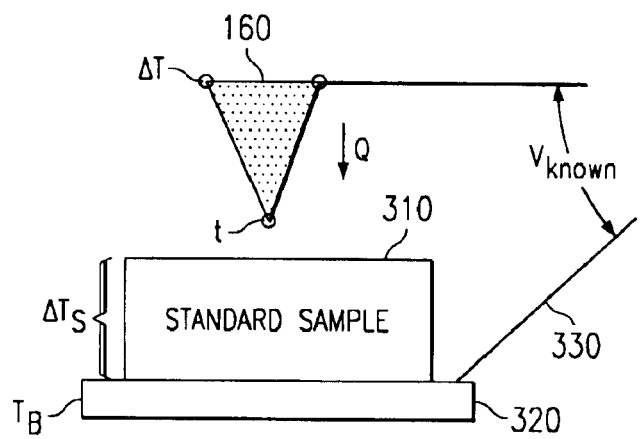
FIG. 10 is an exemplary diagram that illustrates the basic method of heat calibration in accordance with the present invention.

FIG. 10 is an exemplary diagram that illustrates the basic method of heat calibration in accordance with the present invention. The heat flow Q from the tip to the sample surface is calibrated by scanning the probe tip in a contact-mode of operation over thermoelectric materials, such as $Bi_{0.5}Sb_{1.5}Te_3$, $Bi_2Te_{2.9}Se_{0.1}$, ZnSb, and Bi crystals, whose Seebeck coefficient $\alpha_{known}$ and thermal conductivity $\lambda_{known}$ are known. The heat flow balance results in the following equation:

$$Q_p(\Delta T_t) = G\lambda_k \Delta T_s \quad (1)$$

where $\Delta T_s$ is the temperature drop across the sample and G is a geometric parameter. $G \approx 2\pi\alpha$ where α is the "thermal" radius of the probe tip. The value for $\Delta T_s$ equals the ratio of the voltage across the thermocouple between leads 420 and 440 and the Seebeck coefficient of the material (V/α). The open circuit voltage $V_{known}$ is measured across leads 420 and 630. Thus, the equation becomes:

$$\frac{Q_p(\Delta T_t)}{G} = \lambda_{known}(V_{known}/\alpha_{known}) \quad (2)$$

Figure 11:
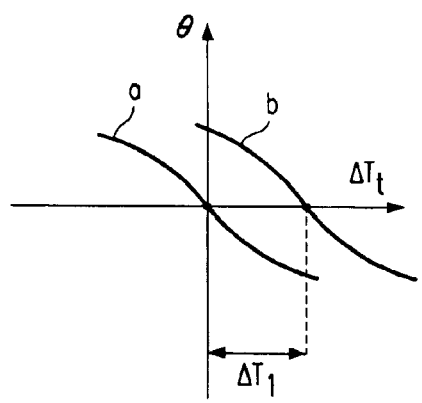
FIG. 11 is an exemplary graph of $\Theta$ versus temperature differential, the relationship having been obtained from heat flow calibration of the probe tip.

As shown in FIG. 11, the quantity $(Q_p/G)$, denoted by Θ, which is sometimes referred to as the normalized heat flow, can be tabulated for standard conditions, e.g., when the laser used for monitoring deflection is turned OFF (curve a) and turned ON (curve b). Θ=0 at $T_t$=0 when the laser is OFF, and at $T_t$=$\Delta T_1$ when the laser is ON. Thus, from the temperature and heat flow calibrations above, the relationships $V_t/T_t$ and $\Theta/\Delta T_t$ provide a complete thermoelectric calibration and characterization of the probe tip.

Figure 12:
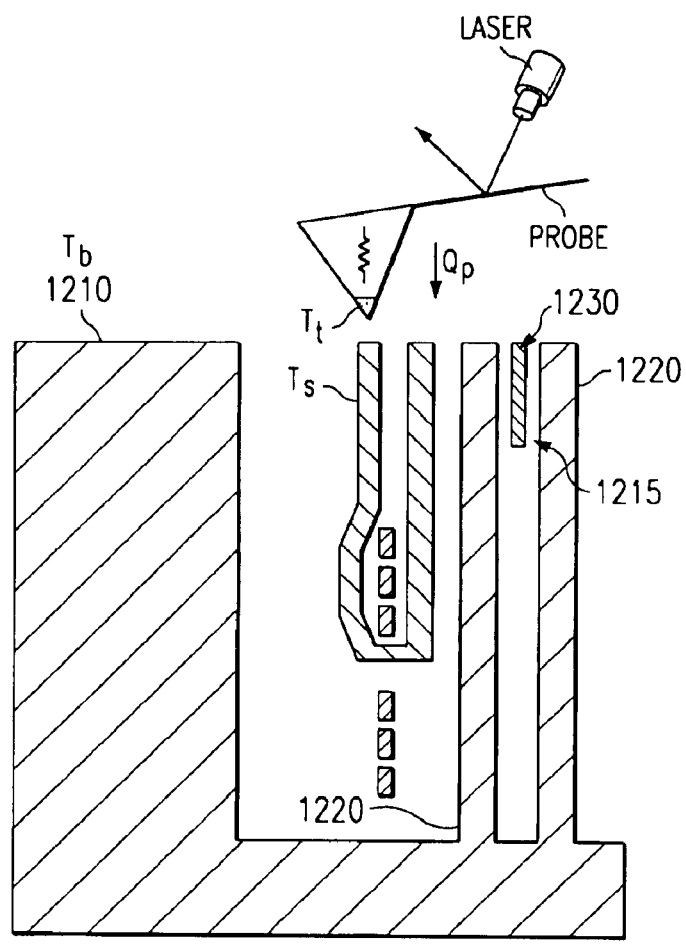
FIG. 12 is an exemplary block diagram illustrating the use of a probe to measure thermal conductance of a dielectric material in a magnetic read/write head.

After calibration, the probe may be used to thermally characterize the GMR sensor of the read/write head. FIG. 12 shows how the probe apparatus of the present invention is applied to the magnetic head of FIG. 3A to perform thermal characterization of the GMR sensor at the tip of the magnetic head. The thermal characterization method exploits the Θ=0 condition at the probe tip to measure the surface temperature. Under this condition, or when the that flow Θ is substantially zero, there is no temperature drop across the interface between the probe tip and the read/write magnetic head. The probe tip is used on the air bearing surface of the read/write magnetic head to measure temperatures and determine heat flow through the probe.

In order to obtain the condition Θ=0 condition at the tip of the probe, the slider backside of the read/write magnetic head is first mounted on a thermoelectric cooler 1210 and the magnetic shields 1220 of the read/write magnetic head are cooled to a temperature $T_b$ less than the ambient temperature $T_a$ ($T_b$<$T_a$ or $T_b$<$T_a$+$\Delta T_1$ if the laser in ON).

Figure 13:
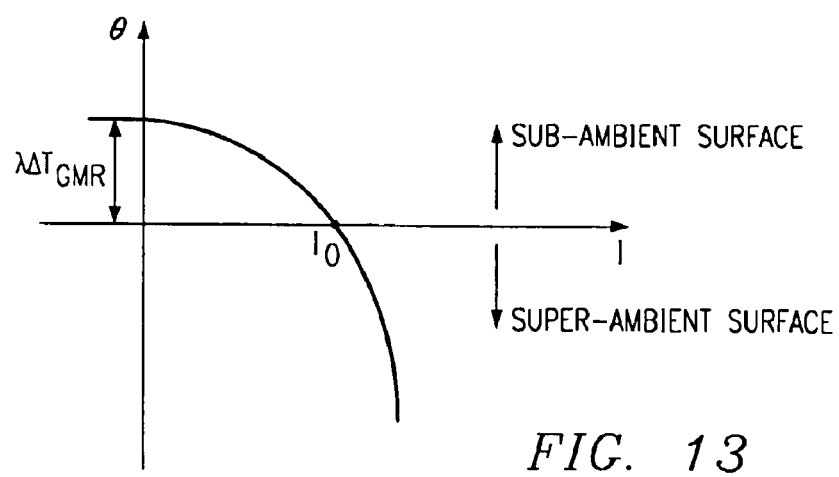
FIG. 13 is a graph of $\Theta$ versus current for a magnetic read/write head under test.

The current through the GMR sensor 1230 is then increased so that the air bearing surface (ABS) warms up and a loci of points on the ABS under the magnetic head attains the condition Θ=0 when I=$I_1$. The heat flux $Q_p$ through the probe tip is zero, or substantially zero, and $T_t$=$T_{gmr}$=$T_a$ (or $T_t$=$T_{gmr}$=$T_a$+$\Delta T_1$ if the laser is ON) on this loci ($T_{gmr}$ is the temperature of the GMR sensor). These contours can be traced for different values of I and $T_b$ and the entire temperature/current behavior can be obtained as shown in FIG. 13.

In particular, when Θ=0 at the center of the GMR sensor 1230, the entire Joule heat at the surface of the GMR sensor is conducted through the dielectric material 1215 to the magnetic shields 1220. Hence the effective thermal conductance K between the GMR sensor 1230 and the magnetic shields 1220 can be calculated from the relation:

$$K_{eff} = (I_0^2 R_{gmr})/(T_a - T_b) \quad (3)$$

Where $K_{eff}$ is the effective thermal conductance, $I_0$ is the current through the GMR sensor, $R_{gmr}$ is the electrical resistance of the GMR sensor which may be determined by measuring the voltage across the GMR sensor, $T_a$ is the ambient temperature, and $T_b$ is a backplane temperature, e.g. the magnetic shield temperature. The above relationship is valid when the temperature of the GMR sensor is substantially the same as the probe tip. However, in many cases the probe tip temperature can be increased by having a heater coil in the probe. In such a case, $T_a$ in the above relationship may be replaced by the probe tip temperature and $T_b$ may be higher than the ambient temperature. Thus, the thermal conductance of the dielectric material 1215 between the GMR sensor 1230 and the magnetic shields 1220 may be obtained when the current being passed through the GMR sensor 1230 is known, the ambient temperature and the thermoelectric cooler temperature are known, and the thermal resistance of the GMR sensor is known. Based on the thermal conductance, the operational behavior of the GMR sensor may be modeled in order to manage the temperature of the magnetic read/write head. By managing the temperature of the magnetic read/write head, optimal performance of the read/write head may be obtained.

For example, using the thermal conductance determined using the probe mechanism described above, the signal to noise ratio of the GMR sensor may be estimated. As mentioned above, the signal to noise ratio provides a measure of the maximum bandwidth obtainable by the GMR sensor. Based on the maximum bandwidth of the GMR sensor, the read speed of the read/write head can be determined. The maximum bandwidth of the GMR sensor may be determined using the relationship:

$$\Delta f \propto (\Delta R/R)^2/((1/K)+(T_b P)) \quad (4)$$

where $\Delta f$ is the bandwidth, $\Delta R$ is a change in the resistance of the GMR sensor, R is the resistance of the GMR sensor, K is the thermal conductance of the GMR sensor, Tb is the backplane or shield temperature, and $P = I^2 R = K(T - T_b)$.

Moreover, the thermoelectrical characteristics of the read/write head may be modeled and cooling of the read/write head may be controlled using the model of the thermoelectric characteristics of the read/write head. Other uses of the measured thermal conductance may be made without departing from the spirit and scope of the present invention.

It is important to note that while the present invention has been described in the context of a probe apparatus coupled to a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of characterizing dielectric material in a magnetic head, comprising:
    using a probe to measure heat flow through the probe;
    controlling a heat flow through the probe to be substantially zero;
    thermally connecting the probe to the magnetic head; and
    calculating a thermal conductance of dielectric material in the magnetic head.

2. The method of claim 1, further comprising:
    cooling the magnetic head to a temperature below ambient temperature; and
    applying a current to the magnetic head to warm the surface of the magnetic head until the heat flow through the probe is substantially zero.

3. The method of claim 2, wherein calculating the thermal conductance includes determining the thermal conductance based on the current, an ambient temperature, and a temperature of the magnetic head.

4. The method of claim 2, wherein the magnetic head includes a giant magnetoresistive sensor sandwiched between the dielectric material, and wherein the current is applied to the giant magnetoresistive sensor.

5. The method of claim 4, wherein calculating the thermal conductance includes calculating the thermal conductance based on the following relation:

$$K=(I^2 R_{gmr})/(T_a-T_b)$$

where K is the thermal conductance, I is the applied current, $R_{gmr}$ is a resistance of the giant magnetoresistive sensor, $T_a$ is an ambient temperature, and $T_b$ is a temperature of the magnetic head.

6. The method of claim 2, wherein cooling the magnetic head to a temperature below ambient temperature includes using a thermoelectric cooler to cool magnetic shields in the magnetic head.

7. The method of claim 1, further comprising modeling thermoelectric characteristics of the magnetic head based on the calculated thermal conductance.

8. The method of claim 7, further comprising controlling cooling of the magnetic head during operation based on the modeling of thermoelectric characteristics of the magnetic head.

9. The method of claim 1, wherein the probe comprises:
    a probe body;
    a probe tip formed on the probe body;
    a first temperature sensor positioned at a tip of the probe tip; and
    a second temperature sensor positioned at a base of the probe tip.

10. The method of claim 9, wherein the first temperature sensor and second temperature sensor are used to measure the heat flow through the probe.

11. The method of claim 1, wherein the read/write head includes a giant magnetoresistive sensor sandwiched between the dielectric material, and wherein the current is applied to the giant magnetoresistive sensor.

12. The method of claim 11, wherein calculating the thermal conductance includes calculating the thermal conductance based on the following relation:

$$K=(I^2 R_{gmr})/(T_a-T_b)$$

where K is the thermal conductance, I is the applied current, $R_{gmr}$ is a resistance of the giant magnetoresistive sensor, $T_a$ is an ambient temperature, and $T_b$ is a temperature of the read/write head.

13. The method of claim 1, further comprising determining a signal to noise ratio of a GMR sensor of the magnetic head based on the thermal conductance of the dielectric material.

14. The method of claim 13, further comprising determining a maximum bandwidth of the GMR sensor based on the signal to noise ratio.

15. A method of controlling thermal operation of a read/write head, comprising:
    thermally connecting a probe to the read/write head;
    determining a thermal conductance of the read/write head by controlling heat flow through the probe to be substantially zero;
    modeling thermoelectric properties of the read/write head based on the determined thermal conductance; and
    controlling thermal operation of the read/write head based on the modeling of the thermoelectric properties.

16. The method of claim 15, wherein determining a thermal conductance includes:
    using the probe to measure heat flow through the probe;
    applying a current to the read/write head to maintain the heat flow through the probe at substantially zero; and
    determining the thermal conductance of dielectric material in the read/write magnetic head based on the current.

17. The method of claim 16, wherein applying the current to the read/write head further comprises:
    cooling the read/write magnetic head to a temperature below ambient temperature; and
    applying the current to the read/write magnetic head to warm up the surface of the read/write magnetic head until the heat flow through the probe is substantially zero.

18. The method of claim 17, wherein cooling the read/write magnetic head to a temperature below ambient temperature includes using a thermoelectric cooler to cool magnetic shields in the read/write head.

19. The method of claim 15, wherein controlling thermal operation of the read/write head includes cooling of the read/write head during operation based on the modeling of thermoelectric characteristics of the read/write head.

20. The method of claim 19, wherein cooling of the read/write head during operation is controlled to maintain a temperature of the read/write head near the ambient temperature.

21. The method of claim 15, wherein the probe comprises:
    a probe body;
    a probe tip formed on the probe body;
    a first temperature sensor positioned at a tip of the probe tip; and
    a second temperature sensor positioned at a base of the probe tip.

22. The method of claim 21, wherein the first temperature sensor and second temperature sensor are used to measure the heat flow through the probe.

23. An apparatus for characterizing dielectric material in a magnetic head, comprising:
- a probe for measuring heat flow through the probe, said probe adapted to be thermally connected to the magnetic head;
- means for controlling heat flow through the probe to be substantially zero; and
- means for calculating a thermal conductance of dielectric material in the magnetic head.

24. The apparatus of claim 23, further comprising:
- means for cooling the magnetic head to a temperature below ambient temperature; and
- means for applying a current to the magnetic head to warm the surface of the magnetic head until the heat flow through the probe is substantially zero.

25. The apparatus of claim 24, wherein the means for calculating the thermal conductance includes means for determining the thermal conductance based on the current, an ambient temperature, and a temperature of the magnetic head.

26. The apparatus of claim 24, wherein the magnetic head includes a giant magnetoresistive sensor sandwiched between the dielectric material, and wherein the means for applying a current applies the current to the giant magnetoresistive sensor.

27. The apparatus of claim 26, wherein the means for calculating the thermal conductance includes means for calculating the thermal conductance based on the following relation:

$$K=(I^2 R_{gmr})/(T_a-T_b)$$

where K is the thermal conductance, I is the applied current, $R_{gmr}$ is a resistance of the giant magnetoresistive sensor, $T_a$ is an ambient temperature, and $T_b$ is a temperature of the magnetic head.

28. The apparatus of claim 24, wherein the means for cooling the magnetic head to a temperature below ambient temperature includes a thermoelectric cooler that cools magnetic shields in the magnetic head.

29. The apparatus of claim 23, further comprising means for modeling thermoelectric characteristics of the magnetic head based on the calculated thermal conductance.

30. The apparatus of claim 29, further comprising means for controlling cooling of the magnetic head during operation based on the modeling of thermoelectric characteristics of the magnetic head.

31. The apparatus of claim 23, wherein the probe comprises:
- a probe body;
- a probe tip formed on the probe body;
- a first temperature sensor positioned at a tip of the probe tip; and
- a second temperature sensor positioned at a base of the probe tip.

32. The apparatus of claim 31, wherein the first temperature sensor and second temperature sensor are used to measure the heat flow through the probe.

33. The apparatus of claim 23, further comprising means for determining a signal to noise ratio of a GMR sensor of the magnetic head based on the thermal conductance of the dielectric material.

34. A computer program product in a computer readable medium for characterizing dielectric material in a magnetic head, comprising:
- first instructions for controlling a probe to measure heat flow through the probe;
- second instructions for controlling heat flow through the probe to be substantially zero;
- third instructions for thermally connecting the probe to the head; and
- fourth instructions for calculating a thermal conductance of dielectric material.

35. The computer program product of claim 34, further comprising:
- fourth instructions for cooling the magnetic head to a temperature below ambient temperature; and
- fifth instructions for applying a current to the magnetic head to warm up the surface of the magnetic head until the heat flow through the probe is substantially zero.

36. The computer program product of claim 35, wherein the third instructions for calculating the thermal conductance includes instructions for determining the thermal conductance based on the current, an ambient temperature, and a temperature of the magnetic head.

37. The computer program product of claim 35, wherein the magnetic head includes a giant magnetoresistive sensor sandwiched between the dielectric material, and wherein the second instructions for applying the current applies the current to the giant magnetoresistive sensor.

38. The computer program product of claim 37, wherein the third instructions for calculating the thermal conductance includes instructions for calculating the thermal conductance based on the following relation:

$$K=(I^2 R_{gmr})/(T_a-T_b)$$

where K is the thermal conductance, T is the applied current, $R_{gmr}$ is a resistance of the giant magnetoresistive sensor, $T_a$ is an ambient temperature, and $T_b$ is a temperature of the magnetic head.

39. The computer program product of claim 35, wherein the fourth instructions for cooling the magnetic head to a temperature below ambient temperature includes instructions for controlling a thermoelectric cooler to cool magnetic shields in the magnetic head.

40. The computer program product of claim 34, further comprising fourth instructions for modeling thermoelectric characteristics of the magnetic head based on the calculated thermal conductance.

41. The computer program product of claim 40, further comprising fifth instructions for controlling cooling of the magnetic head during operation based on the modeling of thermoelectric characteristics of the magnetic head.

42. The apparatus of claim 33, further comprising means for determining a maximum bandwidth of the GMR sensor based on the signal to noise ratio.

43. The computer program product of claim 34, further comprising fourth instructions for determining a signal to noise ratio of a GMR sensor of the magnetic head based on the thermal conductance of the dielectric material.

44. The computer program product of claim 43, further comprising fifth instructions for determining a maximum bandwidth of the GMR sensor based on the signal to noise ratio.

* * * * *

UNITED STATES PATENT AND TRADEMARK OFFICE
CERTIFICATE OF CORRECTION

PATENT NO. : 6,907,322 B2
APPLICATION NO. : 09/726281
DATED : June 14, 2005
INVENTOR(S) : Ghoshal Page 1 of 1

It is certified that error appears in the above-identified patent and that said Letters Patent is hereby corrected as shown below:

Col. 9, line 42: after "when the" delete "that" and insert --heat--.

Signed and Sealed this

Fifth Day of December, 2006

JON W. DUDAS
*Director of the United States Patent and Trademark Office*